United States Patent
Fabri et al.

(10) Patent No.: US 11,812,748 B2
(45) Date of Patent: Nov. 14, 2023

(54) PESTICIDAL COMBINATIONS

(71) Applicant: UPL LTD, West Bengal (IN)

(72) Inventors: Carlos Eduardo Fabri, Sao Paulo (BR); Rajju Devidas Shroff, Maharashtra (IN); Jaidev Rajnikant Shroff, Dubai (AE); Vikram Rajnikant Shroff, Dubai (AE)

(73) Assignee: UPL LTD, West Bengal (IN)

( * ) Notice: Subject to any disclaimer, the term of this patent is extended or adjusted under 35 U.S.C. 154(b) by 192 days.

(21) Appl. No.: 16/620,161

(22) PCT Filed: May 29, 2018

(86) PCT No.: PCT/IB2018/053807
§ 371 (c)(1),
(2) Date: Dec. 6, 2019

(87) PCT Pub. No.: WO2018/224915
PCT Pub. Date: Dec. 13, 2018

(65) Prior Publication Data
US 2020/0138025 A1 May 7, 2020

(30) Foreign Application Priority Data
Jun. 9, 2017 (IN) .............................. 201731020299

(51) Int. Cl.
| A01N 43/56 | (2006.01) |
| A01N 33/26 | (2006.01) |
| A01N 37/22 | (2006.01) |
| A01N 37/40 | (2006.01) |
| A01N 43/36 | (2006.01) |
| A01N 43/40 | (2006.01) |
| A01N 47/14 | (2006.01) |
| A01N 47/34 | (2006.01) |

(52) U.S. Cl.
CPC ............ *A01N 43/56* (2013.01); *A01N 33/26* (2013.01); *A01N 37/22* (2013.01); *A01N 37/40* (2013.01); *A01N 43/36* (2013.01); *A01N 43/40* (2013.01); *A01N 47/14* (2013.01); *A01N 47/34* (2013.01)

(58) Field of Classification Search
None
See application file for complete search history.

(56) References Cited

U.S. PATENT DOCUMENTS

| 2012/0010073 A1 | 1/2012 | Funke et al. |
| 2016/0262386 A1* | 9/2016 | Sikuljak ................. A01N 25/00 |
| 2021/0076677 A1 | 3/2021 | Fabri et al. |

FOREIGN PATENT DOCUMENTS

| CN | 102318610 A | 1/2012 |
| CN | 102630675 A | 8/2012 |
| CN | 103651466 A | 3/2014 |
| CN | 104542137 A | 4/2015 |
| CN | 105028472 A | 11/2015 |
| WO | 2015055757 A1 | 4/2015 |
| WO | 2018224914 A1 | 12/2018 |

OTHER PUBLICATIONS

International Search Report and Written Opinion; International Application No. PCT/IB2018/053807, International Filing Date May 29, 2018, dated Jul. 10, 2018, 14 pages.
Pavithra et al.; "Influence of Insecticides on the Bio-Efficacy of Fungicides Against Cabbage Leaf Spot When Applied as Mixtures"; International Journal of Agricultural Sciences; 8(3); pp. 984-987; (2016).
Colby, S.; "Calculating Synergistic and Antagonistic Responses of Herbicide Combinations"; Weeds, vol. 15, Issue No. 1; 1967; pp. 20-22.
Ditillo, J. et al.; "Effects of Insecticides and Fungicides Commonly Used in Tomato Production on Phytoseiulus persimilis (*Acari: Phtyoseiidae*)"; Journal of Economic Entomology, vol. 109, Issue No. 6; 2016; pp. 2298-2308.
International Search Report and Written Opinion; International Application No. PCT/IB2018/053805; International Filing Date May 29, 2018; dated Aug. 3, 2018; 12 pages.
Jeanguenat, A.; "The story of a new insecticidal chemistry class: the diamides"; Pest Management Science, vol. 69, Issue No. 1; 2012; pp. 7-14.

* cited by examiner

*Primary Examiner* — Bethany P Barham
*Assistant Examiner* — Barbara S Frazier
(74) *Attorney, Agent, or Firm* — CANTOR COLBURN LLP

(57) ABSTRACT

The present invention relates to combinations of a diamide insecticidal compound selected from broflanilide, chlorantraniliprole, cyantraniliprole, cyclaniliprole, cyhalodiamide, flubendiamide or tetraniliprole in combination with at least one multi-site fungicidally active compound and at least another insecticidal compound. The said combinations demonstrate excellent efficacy in the control of unwanted pests.

2 Claims, No Drawings

PESTICIDAL COMBINATIONS

CROSS REFERENCE TO RELATED APPLICATIONS

This application is a National Stage application of PCT/IB2018/053807, filed on May 29, 2018, which claims the benefit of Indian Application No. 201731020299 filed on Jun. 9, 2017, both of which are incorporated by reference in their entirety herein.

TECHNICAL FIELD

The present invention relates to combinations of diamide insecticidal compounds in combination with at least one fungicidally active compound and at least another insecticidal compound. The said combinations demonstrate excellent efficacy in the control of unwanted pests.

BACKGROUND OF THE INVENTION

Insecticides are used to control a wide variety of insect pests. Diamides insecticides are a relatively new group of insecticides and include insecticides such as flubendiamide, a highly potent lepidoptericide and chlorantraniliprole and its analogue cyantraniliprole. Evolution of diamide can be studied in article published Pest Manag Sci. 2013 January; 69(1):7-14.

Chlorantraniliprole and cyantraniliprole are anthranilic diamide Insecticidal compounds which exhibit larvicidal activity as orally ingested toxicants which target and disrupt the $Ca^{2+}$ balance and Ryanodine receptor. Fungicides are an integral and important tool yielded by farmers to control diseases, as well as to improve yields and quality of the crops. There are various fungicides that have been developed over the years with many desirable attributes such as specificity, systemicity, curative and eradicant action and high activity at low use rates.

Various classes of fungicides are also known in the art, such as Quinone outside inhibitors (QoIs), ergosterol-biosynthesis inhibitors, fungicides that act on multiple sites. Dithiocarbamates are multi-site fungicides. These fungicides are used for broad-spectrum disease control in more than 70 crops. Mancozeb is especially important for controlling devastating and fast spreading diseases such as *Phytophthora infestans, Venturia inaequalis* etc. Dithiocarbamate fungicides, especially mancozeb, are particularly useful for disease control because of their broad spectrum of activity, high tolerance by crop plants, and general usefulness for controlling fungal plant diseases not controlled by active compounds that act on only a single target site in the fungus.

The mixing of insecticides with fungicides results in incompatibility of physical nature and may also alter efficacy of the active ingredients. Hence, an attempt has been made to know the compatibility of fungicides with insecticides and their influence of insecticides on the bioefficacy of fungicides against cabbage leaf spot when applied as mixtures under laboratory condition. U.S. Pat. No. 7,696,232 B2 discloses composition comprising Chlorantaniliprole and other actives which includes fungicides.

There is therefore a need in the art for combinations of anthranilamide insecticidal compound with a specific fungicide that helps improve spectrum. With crop tolerances decreasing, lower use rates being imposed and resistance increasingly observed, there is a need for a combination of actives that allows for broader spectrum of disease control that combines curative and preventive actives and has a lower dosage.

Therefore, embodiments of the present invention may ameliorate one or more of the above mentioned problems:

Therefore, embodiments of the present invention may provide combinations of at least two insecticides and a fungicide that possess an enhanced efficacy over the individual active compound used in isolation.

Another object of the present invention is to provide combinations of at least two insecticides and a fungicide that causes an enhanced greening of the crops to which it is administered.

Another object of the present invention is to provide combinations that causes late senescence to the crop to which it is applied thereby resulting into an increasing yield of the crop.

Yet another object of the present invention is to provide combinations that results into reduced fungal disease incidence in the crops to which it is applied.

Another object of the present invention is to provide combinations that achieves increased yield in the crops to which it is applied.

Another object of the present invention is to provide insecticidal and fungicidal combinations that causes an enhanced larvicidal activity.

Another object of the present invention is to provide combinations which enhance the protection to plants from attack or infestation by insects, acarids or nematodes.

Some or all these and other objects of the invention are can be achieved by way of the invention described hereinafter.

SUMMARY OF THE INVENTION

Thus, an aspect of the present invention may provide a combination comprising:
- at least one insecticidal diamide compound selected from broflanilide, chlorantraniliprole, cyantraniliprole, cyclaniliprole, cyhalodiamide, flubendiamide and tetraniliprole;
- at least one multi-site fungicidal compound; and
- at least another insecticidal compound.

Thus, an aspect of the present invention may provide a combination comprising:
- at least one diamide compound selected from broflanilide, chlorantraniliprole, cyantraniliprole, cyclaniliprole, cyhalodiamide, flubendiamide and tetraniliprole;
- at least one dithiocarbamate fungicide; and
- at least another insecticidal compound.

Another aspect of the present invention can provide a combination comprising:
- at least one diamide compound selected from broflanilide, chlorantraniliprole, cyantraniliprole, cyclaniliprole, cyhalodiamide, flubendiamide and tetraniliprole;
- at least one dithiocarbamate fungicide; and
- at least two other insecticidal compounds.

Another aspect of the present invention can provide compositions comprising:
- at least one diamide compound selected from broflanilide, chlorantraniliprole, cyantraniliprole, cyclaniliprole, cyhalodiamide, flubendiamide and tetraniliprole;
- at least one dithiocarbamate fungicide; and
- at least one other insecticidal compound.

Another aspect of the present invention can provide compositions comprising:

at least one diamide compound selected from broflanilide, chlorantraniliprole, cyantraniliprole, cyclaniliprole, cyhalodiamide, flubendiamide and tetraniliprole;

at least one dithiocarbamate fungicide; and at least two other insecticidal compounds.

DETAILED DESCRIPTION

The term 'disease control' as used herein denotes control and prevention of a disease. Controlling effects include all deviation from natural development, for example: killing, retardation, decrease of the fugal disease. The term 'plants' refers to all physical parts of a plant, including seeds, seedlings, saplings, roots, tubers, stems, stalks, foliage and fruits. The term "locus" of a plant as used herein is intended to embrace the place on which the plants are growing, where the plant propagation materials of the plants are sown or where the plant propagation materials of the plants will be placed into the soil. The term "plant propagation material" is understood to denote generative parts of a plant, such as seeds, vegetative material such as cuttings or tubers, roots, fruits, tubers, bulbs, rhizomes and parts of plants, germinated plants and young plants which are to be transplanted after germination or after emergence from the soil. These young plants may be protected before transplantation by a total or partial treatment by immersion. The term "agriculturally acceptable amount of active" refers to an amount of an active that kills or inhibits the plant disease for which control is desired, in an amount not significantly toxic to the plant being treated.

Surprisingly, the insecticidal and/or acaricidal and/or antimicrobial activity or the fungicidal activity and/or the plant-invigorating activity and/or the yield-enhancing activity of the active compound combinations according to the invention are significantly higher than the sum of the activities of the individual active compounds.

It has surprisingly been found that the addition of a multi-site fungicide such as a dithiocarbamate fungicide to the combinations of diamide insecticides with at least another insecticide resulted in surprising and unexpected advantages. It was surprising that the addition of a dithiocarbamate fungicide to the combination of diamide insecticides with at least another insecticidal compound resulted in an enhancement of the efficacy, and a surprising and enhanced pest control.

It has further been found that the addition of a multi-site fungicide such as a dithiocarbamate fungicide to diamide insecticides and application of these combinations during the flowering stage of the crop delayed the senescence in the crop to which they were applied, which led to better greening in the crop thereby increasing the level of photosynthesis occurring within the plant, thereby leading to a greater yield from the crop to which they were applied.

These surprising advantages of the combinations of the invention were not observed when the multi-site fungicide was not present in the combination. Therefore, these unexpected advantages of the combination of the present invention could be attributed to the inclusion of a multi-site fungicide to the combination of a diamide insecticide with at least another insecticidal compound.

Thus, in an aspect, the present invention provides a combination comprising:

(a) at least one insecticidal diamide compound selected from broflanilide, chlorantraniliprole, cyantraniliprole, cyclaniliprole, cyhalodiamide, flubendiamide and tetraniliprole;

(b) at least one multi-site fungicide; and (c) at least another insecticidal compound.

Thus, in an embodiment, the multi-site fungicide maybe selected from the group consisting of dithiocarbamates, phthalimides, chloronitriles, inorganic fungicides, sulfamides, bis-guanidines, triazines, quinones, quinoxalines, dicoarboxamides and mixtures thereof.

In another embodiment, the multi-site contact fungicides of the present invention inhibit fungal growth through multiple sites of action and have contact and preventive activity. In an embodiment, the multi-site contact fungicide may be selected from copper fungicides, sulfur fungicides, dithiocarbamate fungicides, phthalamide fungicides, chloronitrile fungicides, sulfamide fungicides, guanidine fungicides, triazines fungicides and quinone fungicides.

The copper fungicides of the present invention are inorganic compounds containing copper, typically in the copper (II) oxidation state and are preferably selected from copper oxychloride, copper sulfate, copper hydroxide and tribasic copper sulfate (Bordeaux mixture).

The sulfur fungicides of the present invention are inorganic chemicals containing rings or chains of sulfur atoms and is preferably elemental sulfur.

The dithiocarbamate fungicides of the present invention contain a dithiocarbamate molecular moiety and are selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb.

The phthalamide fungicides of the present invention contain a phthalamide molecular moiety and are selected from folpet, captan and captafol.

The chloronitrile fungicide of the present invention comprises an aromatic ring substituted with chloro- and cyano- substituents and is preferably chlorothalonil.

The sulfamide fungicides of the present invention are preferably selected from dichlofluanid and tolylfluanid.

The guanidine fungicides of the present invention are preferably selected from dodine, guazantine and iminoctaadine.

The triazine fungicide of the present invention is preferably anilazine.

The quinone fungicide of the present invention is preferably dithianon.

In a preferred embodiment, the multi-site contact fungicide of the present invention is a dithiocarbamate fungicide selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb.

In an embodiment, the preferred multi-site fungicide is dithiocarbamate fungicides (A) which may be selected from the group consisting of amobam (A1), asomate (A2), azithiram (A3), carbamorph (A4), cufraneb (A5), cuprobam (A6), disulfiram (A7), ferbam (A8), metam (A9), nabam (A10), tecoram (A11), thiram (A12), urbacide (A13), ziram (A14), dazomet (A15), etem (A16), milneb (A17), mancopper (A18), mancozeb (A19), maneb (A20), metiram (A21), polycarbamate (A22), propineb (A23) and zineb (A24) and mixtures thereof.

In an embodiment, the preferred dithiocarbamate fungicide is mancozeb (A19).

In an embodiment, the anthranilamide compound is selected from diamide class (B). However, the choice of anthranilamide compound may not be limited to these diamide class alone.

In an embodiment, the diamide class of anthranilamide compound may be selected from (B1) broflanilide, (B2) chlorantraniliprole, (B3) cyantraniliprole, (B4) cyclaniliprole, (B5) cyhalodiamide, (B6) flubendiamide, (B7) tetraniliprole and mixtures thereof.

Chlorantraniliprole (B2) has the chemical name 3-bromo-4'-chloro-1-(3-chloro-2-pyridyl)-2'-methyl-6'-(methylcarbamoyl)pyrazole-5-carboxanilide and has the structure:

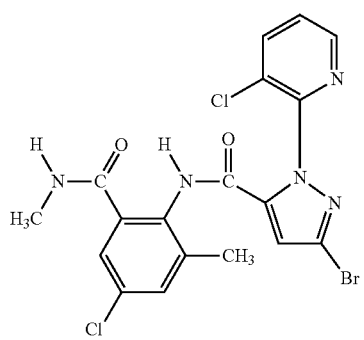 [SMILES: CNC(=O)c1cc(Cl)cc(C)c1NC(=O)c1cc(Br)nn1-c1ncccc1Cl]

Cyantraniliprole (B3) has the chemical name 3-bromo-1-(3-chloro-2-pyridyl)-4'-cyano-2'-methyl-6'-(methylcarbamoyl)pyrazole-5-carboxanilide and the structure:

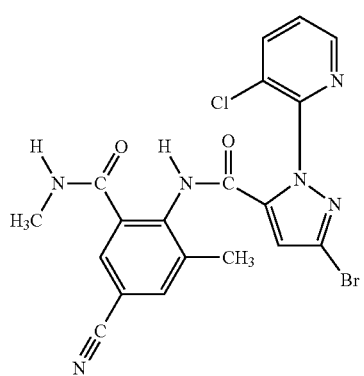 [SMILES: CNC(=O)c1cc(C#N)cc(C)c1NC(=O)c1cc(Br)nn1-c1ncccc1Cl]

Cyclaniliprole (B4) has the chemical name 2',3-dibromo-4'-chloro-1-(3-chloro-2-pyridyl)-6'-{[(1RS)-1-cyclopropylethyl]carbamoyl}pyrazole-5-carboxanilide and has the structure:

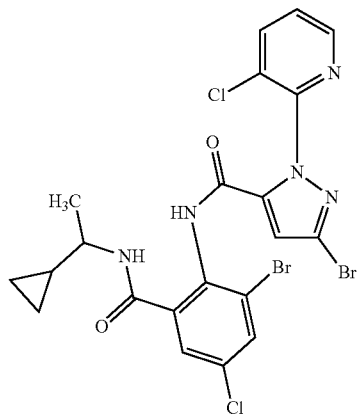 [SMILES: CC(NC(=O)c1cc(Cl)cc(Br)c1NC(=O)c1cc(Br)nn1-c1ncccc1Cl)C1CC1]

Cyhalodiamide (B5) has the chemical name 3-chloro-N'-(1-cyano-1-methylethyl)-N-{4-[1,2,2,2-tetrafluoro-1-(trifluoromethyl)ethyl]-o-tolyl}phthalamide and has the structure:

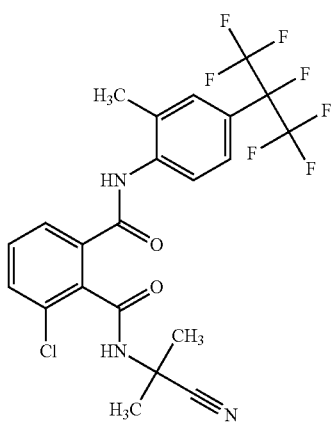 [SMILES: Cc1cc(C(F)(C(F)(F)F)C(F)(F)F)ccc1NC(=O)c1cccc(Cl)c1C(=O)NC(C)(C)C#N]

Flubendiamide (B6) has the chemical 3-iodo-N'-(2-mesyl-1,1-dimethylethyl)-N-{4-[1,2,2,2-tetrafluoro-1-(trifluoromethyl)ethyl]-o-tolyl}phthalamide and have the structure:

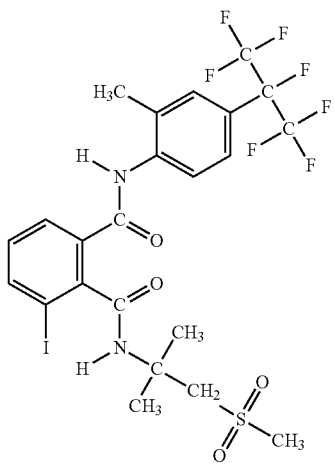 [SMILES: Cc1cc(C(F)(C(F)(F)F)C(F)(F)F)ccc1NC(=O)c1cccc(I)c1C(=O)NC(C)(C)CS(C)(=O)=O]

Tetraniliprole (B7) has the chemical name 1-(3-chloro-2-pyridyl)-4'-cyano-2'-methyl-6'-methylcarbamoyl-3-{[5-(trifluoromethyl)-2H-tetrazol-2-yl]methyl}pyrazole-5-carboxanilide, and has the following structure:

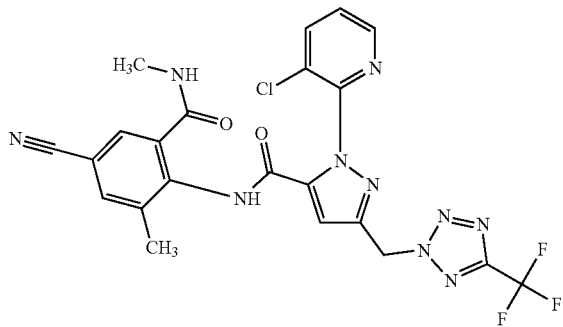 [SMILES: CNC(=O)c1cc(C#N)cc(C)c1NC(=O)c1cc(Cn2nnc(C(F)(F)F)n2)nn1-c1ncccc1Cl]

Broflanilide (B1) has the chemical name 6'-bromo-α,α,α,2-tetrafluoro-3-(N-methylbenzamido)-4'-[1,2,2,2-tetrafluoro-1-(trifluoromethyl)ethyl]benz-o-toluidide, and has the following structure:

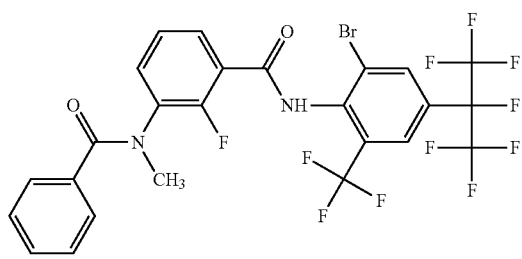 [SMILES: CN(C(=O)c1ccccc1)c1cccc(C(=O)Nc2c(Br)cc(C(F)(C(F)(F)F)C(F)(F)F)cc2C(F)(F)F)c1F]

In an embodiment, the second and/or third insecticidal compound (C) in the combinations of the present invention may be selected from Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators, Glutamate-gated chloride channel (GluCl) allosteric modulators, Juvenile hormone mimics, Chordotonal organ TRPV channel modulators, Mite growth inhibitors, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Inhibitors of chitin biosynthesis, Moulting disruptors, Ecdysone receptor agonists, Octopamine receptor agonists, Mitochondrial complex electron transport inhibitors, Voltage-dependent sodium channel blockers, Inhibitors of acetyl CoA carboxylase, Chordotonal organ Modulators, multi-site miscellaneous insecticides, bioinsecticides and mixtures thereof.

Thus in an embodiment, the Acetylcholinesterase (AChE) inhibitors (C) may be selected from the group consisting of carbamates such as Alanycarb (C1), Aldicarb (C2), Bendiocarb (C3), Benfuracarb (C4), Butocarboxim (C5), Butoxycarboxim (C6), Carbaryl (C7), Carbofuran (C8), Carbosulfan (C9), Ethiofencarb (C9), Fenobucarb (C10), Formetanate (C11), Furathiocarb (C12), Isoprocarb (C13), Methiocarb (C14), Methomyl (C15), Metolcarb (C16), Oxamyl (C17) Pirimicarb (C18), Propoxur (C19), Thiodicarb (C20), Thiofanox (C21), Triazamate (C22), Trimethacarb (C23), XMC (C24), Xylylcarb Organophosphates such as Acephate (C25), Azamethiphos (C26), Azinphos-ethyl (C27), Azinphos-methyl (C28), Cadusafos (C29), Chlorethoxyfos (C30), Chlorfenvinphos (C31), Chlormephos (C32), Chlorpyrifos (C33), Chlorpyrifos-methyl (C34), Coumaphos (C35), Cyanophos (C36), Demeton-S-methyl (C37), Diazinon (C38), Dichlorvos/DDVP (C39), Dicrotophos (C40), Dimethoate (C41), Dimethylvinphos (C42), Disulfoton (C43), EPN (C44), Ethion (C45), Ethoprophos (C46), Famphur (C47), Fenamiphos (C48), Fenitrothion (C49), Fenthion (C50), Fosthiazate (C51), Heptenophos (C52), Imicyafos (C53), Isofenphos (C54), Isopropyl O-(methoxyaminothio-phosphoryl) salicylate (C55), Isoxathion (C56), Malathion (C57), Mecarbam (C58), Methamidophos (C59), Methidathion (C60), Mevinphos (C61), Monocrotophos (C62), Naled (C63), Omethoate (C64), Oxydemeton-methyl (C65), Parathion (C66), Parathion-methyl (C67), Phenthoate (C68), Phorate (C69), Phosalone (C70), Phosmet (C71), Phosphamidon (C72), Phoxim (C73), Pirimiphos-methyl (C74), Profenofos (C75), Propetamphos (C76), Prothiofos (C77), Pyraclofos (C78), Pyridaphenthion (C79), Quinalphos (C80), Sulfotep (C81), Tebupirimfos (C82), Temephos (C83), Terbufos (C84), Tetrachlorvinphos (C85), Thiometon (C86), Triazophos (C87), Trichlorfon (C87), Vamidothion (C88) and mixtures thereof.

In an embodiment, the preferred Acetylcholinesterase (AChE) inhibitors may be selected from thiodicarb (C20), methomyl (C15), acephate (C25), and quinalphos (C80).

In another embodiment, the GABA-gated chloride channel blockers may be selected from Chlordane (C89), Endosulfan (C90), Ethiprole (C91), Fipronil (C92) and mixtures thereof.

The preferred GABA gated chloride channel blocker may be fipronil (C92).

In an embodiment, the Sodium channel modulators may be selected from Pyrethroids such as acrinathrin (C93), allethrin (C94), bioallethrin (C95), esdépalléthrine (C96), barthrin (C97), bifenthrin (C98), kappa-bifenthrin (C99), bioethanomethrin (C100), brofenvalerate (C101), brofluthrinate (C102), bromethrin (C103), butethrin (C104), chlorempenthrin (C105), cyclethrin (C106), cycloprothrin (C107), cyfluthrin (C108), beta-cyfluthrin (C109), cyhalothrin (C110), gamma-cyhalothrin (C111), lambda-cyhalothrin (C112), cypermethrin (C113), alpha-cypermethrin (C114), beta-cypermethrin (C115), theta-cypermethrin (C116), zeta-cypermethrin (C116), cyphenothrin (C117), deltamethrin (C118), dimefluthrin (C119), dimethrin (C120), empenthrin (C121), d-fanshiluquebingjuzhi (C122), chloroprallethrin (123), fenfluthrin (C124), fenpirithrin (C125), fenpropathrin (C126), fenvalerate (C127), esfenvalerate (C128), flucythrinate (C129), fluvalinate (C129), tau-fluvalinate (C130), furamethrin (C131), furethrin (C132), heptafluthrin (C133), imiprothrin (C134), japothrins (C135), kadethrin (136), methothrin (C137), metofluthrin (C138), epsilon-metofluthrin (C139), momfluorothrin (C140), epsilon-momfluorothrin (C141), pentmethrin (C142), permethrin (C143), biopermethrin (C144), transpermethrin (C145), phenothrin (C146), prallethrin (C147), profluthrin (C148), proparthrin (C149), pyresmethrin (C150), renofluthrin (151), meperfluthrin (C152), resmethrin (C153), bioresmethrin (C154), cismethrin (C155), tefluthrin (C156), kappa-tefluthrin (C157), terallethrin (C158), tetramethrin (C159), tetramethylfluthrin (C160), tralocythrin (C161), tralomethrin (C162), transfluthrin (C163), valerate (C164), etofenprox (C165), flufenprox (C166), halfenprox (C167), protrifenbute (C168), silaflu-ofen (C169), sulfoxime ((RS)-[1-(4-chlorophenyl)-2-(methylthio)-1-propanone] (EZ)-O-(3-phenoxybenzyl)oxime) (C170), thiofluoximate (C171) or DDT (C172), Methoxychlor (C173), natural pyrethrins such as cinerin-I (C174), cinerin-II (C175), jasmolin-I (C176), jasmolin-II (C177), pyrethrin-I (C178) and pyrethrin-II (C179) or mixtures thereof.

The preferred Sodium channel modulator may be bifenthrin (C98), kappa-bifenthrin (C99), gamma-cyhalothrin (C111), lambda-cyhalothrin (C112), cypermethrin (C113), alpha-cypermethrin (C114), beta-cypermethrin (C115), theta-cypermethrin (C116), zeta-cypermethrin (C116), fenpropathrin (C126), permethrin (C143) and mixtures thereof.

In an embodiment, the nicotinic acetylcholine receptor (nAChR) competitive modulators may be selected from Neonicotinoids such as Acetamiprid (C180), Clothianidin (C181), Dinotefuran (C182), Imidacloprid (C183), Nitenpyram (C184), Thiacloprid (C185), Thiamethoxam (C186); Sulfoximines such as sulfoxaflor (185); Butenolides such as Flupyradifurone (C186); Mesoionics such as Triflumezopyrim (C186) and mixtures thereof.

The preferred nicotinic acetylcholine receptor (nAChR) competitive modulators may be Acetamiprid (C180), Clothianidin (C181), Imidacloprid (C183), Thiacloprid (C185), Thiamethoxam (C186), sulfoxaflor (185).

In an embodiment, the Nicotinic acetylcholine receptor (nAChR) allosteric modulators may be selected from Spinosyns such as Spinetoram (C187), Spinosad (C188) and mixtures thereof.

The preferred Nicotinic acetylcholine receptor (nAChR) allosteric modulators may be Spinosad (C188).

In an embodiment, the Glutamate gated chloride channel (GluCl) allosteric modulators such as Avermectins selected from Abamectin (C189), Emamectin benzoate (C190), Lepimectin (C191) and Milbemycins such as Milbemectin (C192), milbemycin A3 (C193), Milbemycin A4 (C194), Mildiomycin (C195) and mixtures thereof.

The preferred Glutamate gated chloride channel (GluCl) allosteric modulators may be abamectin (C189).

In an embodiment, the Juvenile hormone mimics may be selected from Hydroprene (C196), Kinoprene (C197), Methoprene (C198), Fenoxycarb (C199), Pyriproxyfen (C200) and mixtures thereof.

The preferred juvenile hormone mimic may be Pyriproxyfen (C200).

In an embodiment, the Miscellaneous nonspecific (multisite) inhibitor insecticides may be selected from Methyl bromide and the like, Chloropicrin (C201), Cryolite (Sodium aluminum fluoride) (C202), Sulfuryl fluoride (C203), Borax (C204), Boric acid (C205), Disodium octaborate (C206), Sodium borate (C207), Sodium metaborate (C208), Tartar emetic (C209), Dazomet (C210), Metam (C211) and mixtures thereof.

In an embodiment, the Chordotonal organ TRPV channel modulators may be selected from Pymetrozine (C212), Pyrifluquinazon (C213) and mixtures thereof.

In an embodiment, Mite growth inhibitors may be selected from Clofentezine (C214), Diflovidazin (C215), Hexythiazox (C216), Etoxazole (C217) and mixtures thereof.

In an embodiment, Microbial disruptors of insect midgut membranes may be selected from *Bacillus thuringiensis* subsp. *Israelensis* (C218), *Bacillus thuringiensis* subsp. *aizawai* (C219), *Bacillus thuringiensis* subsp. *kurstaki* (C219), *Bacillus thuringiensis* subsp. *tenebrionis* (C220), B.t. crop proteins such as Cry1Ab (C221), Cry1Ac (C222), Cry1Fa (C223), Cry1A.105 (224), Cry2Ab (C225), Vip3A (C226), mCry3A (C227), Cry3Ab (C228), Cry3Bb (C229), Cry34Ab1/Cry35Ab1 (C230), *Bacillus sphaericus* (C231) and the like.

In an embodiment, Inhibitors of mitochondrial ATP synthase may be selected from Diafenthiuron (C232), Azocyclotin (C233), Cyhexatin (C234), Fenbutatin oxide (C235), Propargite (236), Tetradifon (C237) and mixtures thereof.

In an embodiment, the Uncouplers of oxidative phosphorylation via disruption of the proton gradient may be selected from Chlorfenapyr (C238), DNOC (C239), Sulfluramid (C240) and mixtures thereof.

In an embodiment. Nicotinic acetylcholine receptor (nAChR) channel blockers may be selected from Bensultap (C241), Cartap hydrochloride (C242), Thiocyclam (C243), Thiosultap-sodium (C244) and mixtures thereof.

In an embodiment, Inhibitors of chitin biosynthesis may be selected from Bistrifluron (C245), Chlorfluazuron (C246), Diflubenzuron (C247), Flucycloxuron (C248), Flufenoxuron (C249), Hexaflumuron (C250), Lufenuron (C251), Novaluron (C252), Noviflumuron (C253), Teflubenzuron (C254), Triflumuron (C255), Buprofezin (C256) and mixtures thereof.

The preferred Inhibitors of chitin biosynthesis may be Novaluron (C252), Chlorfluazuron (C246), Lufenuron (C251), Buprofezin (C256).

In an embodiment, moulting disruptors may be selected from cyromazine (C257) and the like.

In an embodiment, Ecdysone receptor agonists may be selected from Chromafenozide (C258), Halofenozide (C259), Methoxyfenozide (C260), Tebufenozide (C261) and mixtures thereof.

The preferred Ecdysone receptor agonists may be selected from Methoxyfenozide (C260).

In an embodiment, Octopamine receptor agonists may be selected from amitraz (C262) and the like.

In an embodiment, Mitochondrial complex electron transport inhibitors may be selected from Hydramethylnon (C263), Acequinocyl (C264), Fluacrypyrim (C265), Bifenazate (C266), Fenazaquin (C267), Fenpyroximate (C268), Pyridaben (C269), Pyrimidifen (C270), Tebufenpyrad (C271), Tolfenpyrad (C272), Rotenone (C273), Aluminium phosphide (C274), Calcium phosphide (C275), Phosphine (C276), Zinc phosphide (C277), Calcium cyanide (C278), Potassium cyanide (C279), Sodium cyanide (280), Cyenopyrafen (C281), Cyflumetofen (C282), Pyflubumide (C283) and mixtures thereof.

The preferred mitochondrial complex electron transport inhibitors may be Bifenazate (C266), Fenpyroximate (C268), Pyridaben (C269), Tebufenpyrad (C270), Tolfenpyrad (C271).

In an embodiment, Voltage-dependent sodium channel blockers may be selected from Indoxacarb (C272), Metaflumizone (C273) and mixtures thereof.

In an embodiment, Inhibitors of acetyl CoA carboxylase may be selected from Tetronic and Tetramic acid derivatives such as Spirodiclofen (C274), Spiromesifen (C275), Spirotetramat (C276) and, Spiropidion (C277) mixtures thereof.

In an embodiment, Chordotonal organ Modulators—undefined target site may be selected from Flonicamid (C278) and the like.

In an embodiment, the biopesticide may be selected from botanical insecticides such as azadirectin A (C279), euginol (C280), neem oil (C281), toosendanin (C282), 1-cinnamoyl-3-feruoyl-11-hydroxymeliacarpin (C283), volkensin (C284), d-limonene (C285), menthol, (C286) 1,8-cineole (C287), citronellal (C288), eugenol (C289) p-menthane-3, 8-diol (C290), thymol (C291) and the like and mixtures thereof.

In an embodiment the preferred amide anthranilamide insecticidal compound is chlorantraniliprole.

In an embodiment, the preferred anthranilamide insecticide compound is cyantraniliprole.

Thus, an aspect of the present invention may provide combinations comprising:
(a) at least one diamide insecticide selected from broflanilide, chlorantraniliprole, cyantraniliprole, cyclaniliprole, cyhalodiamide, flubendiamide and tetraniliprole;
(b) at least one multi-site contact fungicide selected from:
  (i) copper fungicides selected from copper oxychloride, copper sulfate, copper hydroxide and tribasic copper sulfate (Bordeaux mixture);
  (ii) elemental sulfur;
  (iii) dithiocarbamate fungicides selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb;
  (iv) phthalimide fungicides selected from folpet, captan and captafol;
  (v) chlorothalonil;
  (vi) sulfamide fungicides selected from dichlofluanid and tolylfluanid;
  (vii) guanidine fungicides selected from dodine, guazantine and iminoctaadine;
  (viii) anilazine;
  (ix) dithianon; and
  (x) combinations thereof;
(c) at least one insecticidal active selected from Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators, Glutamate-gated chloride channel (GluCl) allosteric modulators, Juvenile hormone mimics, Chordotonal organ TRPV channel modulators, Mite growth inhibitors, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Inhibitors of chitin biosynthesis, Moulting disruptors, Ecdysone receptor agonists, Octopamine receptor agonists, Mitochondrial complex electron transport inhibitors, Voltage-dependent sodium channel blockers, Inhibitors of acetyl CoA carboxylase, Chordotonal organ Modulators, multi-site miscellaneous insecticides, bioinsecticides and mixtures thereof.

In another embodiment, the present invention may provide combinations comprising:
(a) at least one diamide insecticide selected from broflanilide, chlorantraniliprole, cyantraniliprole, cyclaniliprole, cyhalodiamide, flubendiamide and tetraniliprole;
(b) at least one dithiocarbamate fungicide selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb;
(c) at least one insecticidal active selected from Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators, Glutamate-gated chloride channel (GluCl) allosteric modulators, Juvenile hormone mimics, Chordotonal organ TRPV channel modulators, Mite growth inhibitors, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Inhibitors of chitin biosynthesis, Moulting disruptors, Ecdysone receptor agonists, Octopamine receptor agonists, Mitochondrial complex electron transport inhibitors, Voltage-dependent sodium channel blockers, Inhibitors of acetyl CoA carboxylase, Chordotonal organ Modulators, multi-site miscellaneous insecticides, bioinsecticides and mixtures thereof.

The combinations of the present invention may be formulated in the form of a composition.

In an embodiment, the present invention may provide a composition comprising:
(a) at least one diamide insecticidal compound selected from broflanilide, chlorantraniliprole, cyantraniliprole, cyclaniliprole, cyhalodiamide, flubendiamide and tetraniliprole;
(b) at least one dithiocarbamate fungicide;
(c) at least another insecticide; and
(d) at least one agrochemically acceptable excipient.

In an embodiment, the present invention may provide a composition comprising:
(a) at least one diamide insecticidal compound selected from broflanilide, chlorantraniliprole, cyantraniliprole, cyclaniliprole, cyhalodiamide, flubendiamide and tetraniliprole;
(b) at least one dithiocarbamate fungicide;
(c) at least another insecticidal active;
(d) at least one other agrochemical active; and
(e) at least one agrochemically acceptable excipient.

The amount of a composition according to the invention to be applied, will depend on various factors, such as the subject of the treatment, such as, for example plants, soil or seeds; the type of treatment, such as, for example spraying, dusting or seed dressing; the purpose of the treatment, such as, for example prophylactic or therapeutic disease control; in case of disease control the type of fungi to be controlled or the application time. This amount of the combinations of the present invention to be applied can be readily deduced by a skilled agronomist.

The compositions of the present invention maybe mixed with other agrochemically active including but not limited to herbicide, fungicides, fertilizers, plant growth regulators and the like.

Thus in an embodiment, the present invention may provide compositions comprising:
(a) at least one diamide insecticide selected from broflanilide, chlorantraniliprole, cyantraniliprole, cyclaniliprole, cyhalodiamide flubendiamide, tetraniliprole;
(b) at least one dithiocarbamate fungicide; and
(c) at least one other insecticidal active.

In an embodiment, the total amount of diamide insecticidal compound in the composition may typically be in the range of 0.1 to 99% by weight, preferably 0.2 to 90% by weight. The total amount of dithiocarbamate fungicide in the composition may be in the range of 0.1 to 99% by weight. The total amount of the other insecticidal active in the composition may be in the range of 0.1 to 99% by weight.

In an embodiment, the constituent fungicides of the combination of the present invention may be admixed in ratio of (1-80):(1-80):(1-80) of the dithiocarbamate fungicide, anthranilamide insecticidal compound and one other insecticide respectively.

In an embodiment, the constituents of the composition of the present invention may be tank mixed and sprayed at the locus of the infection, or may be alternatively be mixed with surfactants and then sprayed.

In an embodiment, the constituents of the composition of the present invention may be used for foliar application, ground or applications to plant propagation materials.

In an embodiment, the compositions of the present invention may typically be produce by mixing the actives in the composition with an inert carrier, and adding surfactants and other adjuvants and carriers as needed and formulated into solid, or liquid formulations, including but not limited to wettable powders, granules, dusts, soluble (liquid) concentrates, suspension concentrates, oil in water emulsion, water in oil emulsion, emulsifiable concentrates, capsule suspensions, ZC formulations, oil dispersions or other known formulation types. The composition may also be used for treatment of a plant propagation material such as seeds etc.

Examples of the solid carrier used in formulation include fine powders or granules such as minerals such as kaolin clay, attapulgite clay, bentonite, montmorillonite, acid white clay, pyrophyllite, talc, diatomaceous earth and calcite; natural organic materials such as corn rachis powder and walnut husk powder; synthetic organic materials such as urea; salts such as calcium carbonate and ammonium sulfate; synthetic inorganic materials such as synthetic hydrated silicon oxide; and as a liquid carrier, aromatic hydrocarbons such as xylene, alkylbenzene and methylnaphthalene; alcohols such as 2-propanol, ethyleneglycol, propylene glycol, and ethylene glycol monoethyl ether; ketones such as acetone, cyclohexanone and isophorone; vegetable oil such as soybean oil and cotton seed oil; petroleum aliphatic hydrocarbons, esters, dimethylsulfoxide, acetonitrile and water.

Examples of the surfactant include anionic surfactants such as alkyl sulfate ester salts, alkylaryl sulfonate salts, dialkyl sulfosuccinate salts, polyoxyethylene alkylaryl ether phosphate ester salts, lignosulfonate salts and naphthalene sulfonate formaldehyde polycondensates; and nonionic surfactants such as polyoxyethylene alkyl aryl ethers, polyoxyethylene alkylpolyoxypropylene block copolymers and sorbitan fatty acid esters and cationic surfactants such as alkyltrimethylammonium salts.

Examples of the other formulation auxiliary agents include water-soluble polymers such as polyvinyl alcohol and polyvinylpyrrolidone, polysaccharides such as Arabic gum, alginic acid and the salt thereof, CMC (carboxymethyl-cellulose), Xanthan gum, inorganic materials such as aluminum magnesium silicate and alumina sol, preservatives, coloring agents and stabilization agents such as PAP (acid phosphate isopropyl) and BHT.

The compositions according to the present invention is effective for the following plant diseases:

Disease in rice: Blast (*Magnaporthe grisea*), *Helminthosporium* leaf spot (*Cochliobolus miyabeanus*), sheath blight (*Rhizoctonia solani*), and bakanae disease (*Gibberella fujikuroi*).

Diseases in wheat: powdery mildew (*Erysiphe graminis*), Fusariuin head blight (*Fusarium graminearum, F. avenacerum, F. culmorum, Microdochium nivale*), rust (*Puccinia striiformis, P. graminis, P. recondita*), pink snow mold (*Micronectriella nivale*), Typhula snow blight (*Typhula* sp.), loose smut (*Ustilago tritici*), bunt (*Tilletia caries*), eyespot (*Pseudocercosporella herpotrichoides*), leaf blotch (*Mycosphaerella graminicola*), glume blotch (*Stagonospora nodorum*), septoria, and yellow spot (*Pyrenophora tritici-repentis*).

Diseases of barley: powdery mildew (*Erysiphe graminis*), *Fusarium* head blight (*Fusarium graminearum, F. avenacerum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and *Rhizoctonia* damping-off (*Rhizoctonia solani*).

Diseases in corn: smut (*Ustilago maydis*), brown spot (*Cochliobolus heterostrophus*), copper spot (*Gloeocercospora sorghi*), southern rust (*Puccinia polysora*), gray leaf spot (*Cercospora zeae-maydis*), white spot (*Phaeosphaeria mydis* and/or *Pantoea ananatis*) and *Rhizoctonia* damping-off (*Rhizoctonia solani*).

Diseases of citrus: melanose (*Diaporthe citri*), scab (*Elsinoe fawcetti*), penicillium rot (*Penicillium digitatum, P. italicum*), and brown rot (*Phytophthora parasitica, Phytophthora citrophthora*).

Diseases of apple: blossom blight (*Monilinia mali*), canker (*Valsa ceratosperma*), powdery mildew (*Podosphaera leucotricha*), *Alternaria* leaf spot (*Alternaria alternata* apple pathotype), scab (*Venturia inaequalis*), powdery mildew, bitter rot (*Colletotrichum acutatum*), crown rot (*Phytophtora cactorum*), blotch (*Diplocarpon mali*), and ring rot (*Botryosphaeria berengeriana*).

Diseases of pear: scab (*Venturia nashicola, V. pirina*), powdery mildew, black spot (*Alternaria alternata* Japanese pear pathotype), rust (*Gymnosporangium haraeanum*), and phytophthora fruit rot (*Phytophtora cactorum*).

Diseases of peach: brown rot (*Monilinia fructicola*), powdery mildew, scab (*Cladosporium carpophilum*), and phomopsis rot (*Phomopsis* sp.).

Diseases of grape: anthracnose (*Elsinoe ampelina*), ripe rot (*Glomerella cingulata*), powdery mildew (*Uncinula necator*), rust (*Phakopsora ampelopsidis*), black rot (*Guignardia bidwellii*), botrytis, and downy mildew (*Plasmopara viticola*).

Diseases of Japanese persimmon: anthracnose (*Gloeosporium kaki*), and leaf spot (*Cercospora kaki, Mycosphaerella nawae*).

Diseases of gourd: anthracnose (*Colletotrichum lagenarium*), powdery mildew (*Sphaerotheca fuliginea*), gummy stem blight (*Mycosphaerella melonis*), *Fusarium* wilt (*Fusarium oxysporum*), downy mildew (*Pseudoperonospora cubensis*), Phytophthora rot (*Phytophthora* sp.), and damping-off (*Pythium* sp).

Diseases of tomato: early blight (*Alternaria solani*), leaf mold (*Cladosporium fulvum*), and late blight (*Phytophthora infestans*).

Diseases of eggplant: brown spot (*Phomopsis vexans*), and powdery mildew (*Erysiphe cichoracearum*) Diseases of cruciferous vegetables: Alternaria leaf spot (*Alternaria japonica*), white spot (*Cercosporella brassicae*), clubroot (*Plasmodiophora brassicae*), and downy mildew (*Peronospora parasitica*).

Diseases of onion: rust (*Puccinia allii*), and downy mildew (*Peronospora destructor*).

Diseases of soybean: purple seed stain (*Cercospora kikuchii*), sphaceloma scad (*Elsinoe* glycines), pod and stem blight (*Diaporthe phaseolorum* var. *sojae*), septoria brown spot (*Septoria glycines*), frogeye leaf spot (*Cercospora sojina*), rust (*Phakopsora pachyrhizi*), Yellow rust, brown stem rot (*Phytophthora sojae*), and Rhizoctonia damping-off (*Rhizoctonia solani*).

Diseases of kidney bean: anthracnose (*Colletotrichum lindemthianum*). Diseases of peanut: leaf spot (*Cercospora*

*personata*), brown leaf spot (*Cercospora arachidicola*) and southern blight (*Sclerotium rolfsii*).

Diseases of garden pea: powdery mildew (*Erysiphe pisi*), and root rot (*Fusarium solani* f. sp. *pisi*).

Diseases of potato: early blight (*Alternaria solani*), late blight (*Phytophthora infestans*), pink rot (*Phytophthora erythroseptica*), and powdery scab (*Spongospora subterranean* f. sp. *subterranea*).

Diseases of strawberry: powdery mildew (*Sphaerotheca humuli*), and anthracnose (*Glomerella cingulata*).

Diseases of tea: net blister blight (*Exobasidium reticulatum*), white scab (*Elsinoe leucospila*), gray blight (*Pestalotiopsis* sp.), and anthracnose (*Colletotrichum theae-sinensis*).

Diseases of tobacco: brown spot (*Alternaria longipes*), powdery mildew (*Erysiphe cichoracearum*), anthracnose (*Colletotrichum tabacum*), downy mildew (*Peronospora tabacina*), and black shank (*Phytophthora nicotianae*).

Diseases of rapeseed: sclerotinia rot (*Sclerotinia sclerotiorum*), and Rhizoctonia damping-off (*Rhizoctonia solani*). Diseases of cotton: Rhizoctonia damping-off (*Rhizoctonia solani*).

Diseases of sugar beat: Cercospora leaf spot (*Cercospora beticola*), leaf blight (*Thanatephorus cucumeris*), Root rot (*Thanatephorus cucumeris*), and Aphanomyces root rot (*Aphanomyces cochlioides*).

Diseases of rose: black spot (*Diplocarpon rosae*), powdery mildew (*Sphaerotheca pannosa*), and downy mildew (*Peronospora sparsa*). Diseases of chrysanthemum and asteraceous plants: downy mildew (*Bremia lactucae*), leaf blight (*Septoria chrysanthemi-indici*), and white rust (*Puccinia horiana*).

Diseases of various groups: diseases caused by *Pythium* spp. (*Pythium aphanidermatum, Pythium debarianum, Pythium graminicola, Pythium irregulare, Pythium ultimum*), gray mold. (*Botrytis cinerea*), and Sclerotinia rot (*Sclerotinia sclerotiorum*).

Disease of Japanese radish: Alternaria leaf spot (*Alternaria brassicicola*).

Diseases of turfgrass: dollar spot (*Sclerotinia homeocarpa*), and brown patch and large patch (*Rhizoctonia solani*).

Disease of banana: Black sigatoka (*Mycosphaerella fijiensis*), Yellow sigatoka (*Mycosphaerella musicola*).

Disease of sunflower: downy mildew (*Plasmopara halstedii*).

Seed diseases or diseases in the early stages of the growth of various plants caused by *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp. and *Diplodia* spp.

Viral diseases of various plants mediated by *Polymixa* spp. or *Olpidium* spp. and so on.

In an embodiment the insect pests controlled by the combinations of the present invention may belong to the class Insecta, Arachnida and Nematoda. Exemplary pests may include: from the order Lepidoptera, pests such as *Acleris* spp., *Adoxophyes* spp., *Aegeria* spp., *Agrotis* spp., *Alabama argillaceae, Amylois* spp., *Anticarsia gemmatalis, Archips* spp., *Argyrotaenia* spp., *Autographa* spp., *Busseola fusca, Cadra cautella, Carposina nipponensis, Chilo* spp., *Choristoneura* spp., *Clysia ambiguella, Cnaphalocrocis* spp., *Cnephasia* spp., *Cochylis* spp., *Coleophora* spp., *Crocidolomia* spp., *Cryptophlebia leucotreta, Crysodeixis includens, Cydia* spp., *Diatraea* spp., *Diparopsis castanea, Earias* spp., *Elasmopalpus* spp., *Ephestia* spp., *Eucosma* spp., *Eupoecilia ambiguella, Euproctis* spp., *Euxoa* spp., *Grapholita* spp., *Hedya nubiferana, Heliothis* spp., *Hellula undalis, Hyphantria cunea, Keiferia lycopersicella, Leucoptera scitella, Lithocollethis* spp., *Lobesia botrana, Lymantria* spp., *Lyonetia* spp., *Malacosoma* spp., *Mamestra brassicae, Manduca sexta, Operophtera* spp., *Ostrinia nubilalis, Pammene* spp., *Pandemis* spp., *Panolis flammea, Pectinophora gossypiella, Phthorimaea operculella, Pieris rapae, Pieris* spp., *Plutella xylostella, Prays* spp., *Scirpophaga* spp., *Sesamia* spp., *Sparganothis* spp., *Spodoptera* spp., *Synanthedon* spp., *Thaumetopoea* spp., *Tortrix* spp., *Trichoplusia ni* and *Yponomeuta* spp.; from the order Coleoptera, pest such as *Agriotes* spp., *Anthonomus* spp., *Atomaria linearis, Ceutorhynchus* spp., *Chaetocnema tibialis, Cosmopolites* spp., *Curculio* spp., *Dermestes* spp., *Diabrotica* spp., *Epilachna* spp., *Eremnus* spp., *Gonocephalum* spp., *Heteronychus* spp., *Leptinotarsa decemlineata, Lissorhoptrus* spp., *Melolontha* spp., *Orycaephilus* spp., *Otiorhynchus* spp., *Phlyctinus* spp., *Phyllotreta* spp., *Popillia* spp., *Protostrophus* spp., *Psylliodes* spp., *Rhizopertha* spp., *Scarabeidae, Sitophilus* spp., *Sitotroga* spp., *Tenebrio* spp., *Tribolium* spp. and *Trogoderma* spp.; from the order Orthoptera, pests such as *Blatta* spp., *Blattella* spp., *Gryllotalpa* spp., *Leucophaea maderae, Locusta* spp., *Periplaneta* spp. and *Schistocerca* spp.; from the order Isoptera, pests such as *Reticulitermes* spp.; from the order Psocoptera pest such as, *Liposcelis* spp.; from the order Anoplura, pests such as *Haematopinus* spp., *Linognathus* spp., *Pediculus* spp., *Pemphigus* spp. and *Phylloxera* spp.; from the order Mallophaga pests such as *Damalinea* spp. and *Trichodectes* spp.; rom the order Thysanoptera, pests such as *Frankliniella* spp., *Hercinothrips* spp., *Taeniothrips* spp., *Thrips palmi, Thrips tabaci* and *Scirtothrips aurantii*; from the order Heteroptera, pests such as *Dichelops melacanthus, Distantiella theobroma, Dysdercus* spp., *Euchistus* spp., *Eurygaster* spp., *Leptocorisa* spp., *Nezara* spp., *Piesma* spp., *Rhodnius* spp., *Sahlbergella singularis, Scotinophara* spp. and *Triatoma* spp.; from the order Homoptera, insect pests such as *Aleurothrixus floccosus, Aleyrodes brassicae, Aonidiella* spp., *Aphididae, Aphis* spp., *Aspidiotus* spp., *Bemisia tabaci, Ceroplaster* spp., *Chrysomphalus aonidium, Chrysomphalus dictyospermi, Coccus hesperidum, Empoasca* spp., *Eriosoma larigerum, Erythroneura* spp., *Gascardia* spp., *Laodelphax* spp., *Lecanium corni, Lepidosaphes* spp., *Macrosiphus* spp., *Myzus* spp., *Nephotettix* spp., *Nilaparvata* spp., *Paratoria* spp., *Pemphigus* spp., *Planococcus* spp., *Pseudaulacaspis* spp., *Pseudococcus* spp., *Psylla* spp., *Pulvinaria aethiopica, Quadraspidiotus* spp., *Rhopalosiphum* spp., *Saissetia* spp., *Scaphoideus* spp., *Schizaphis* spp., *Sitobion* spp., *Trialeurodes vaporariorum, Trioza erytreae* and *Unaspis citri*; from the order Hymenoptera, insect pests such as Acromyrmex, *Athalia rosae, Atta* spp., *Cephus* spp., *Diprion* spp., *Diprionidae, Gilpinia polytoma, Hoplocampa* spp., *Lasius* spp., *Monomorium pharaonis, Neodiprion* spp., *Solenopsis* spp. and *Vespa* spp.; from the order Diptera, insect pests such as *Antherigona soccata, Bibio hortulanus, Ceratitis* spp., *Chrysomyia* spp., *Culex* spp., *Cuterebra* spp., *Dacus* spp., *Delia* spp., *Drosophila melanogaster, Liriomyza* spp., *Melanagromyza* spp., *Orseolia* spp., *Oscinella frit, Pegomyia hyoscyami, Phorbia* spp., *Rhagoletis pomonella, Sciara* spp.; from the order Acarina, pests such as *Acarus siro, Aceria sheldoni, Aculus schlechtendali, Amblyomma* spp., *Argas* spp., *Brevipalpus* spp., *Bryobia praetiosa, Calipitrimerus* spp., *Chorioptes* spp., *Dermanyssus gallinae, Eotetranychus carpini, Eriophyes* spp., *Hyalomma* spp., *Olygonychus pratensis, Ornithodoros* spp., *Panonychus* spp., *Phyllocoptruta* spp. (*such as Phyllocoptruta oleivora*), *Polyphagotarsonemus latus, Psoroptes* spp., *Rhipicephalus* spp., *Rhizoglyphus* spp., *Sarcoptes* spp., *Tarsonemus* spp. and *Tetranychus* spp.; and from the class Nematoda, the species of *Meloidogyne* spp. (for example, *Meloidogyne incoginita* and *Meloidogyne javanica*), *Heterodera* spp. (for example, *Heterodera glycines, Heterodera schachtii, Heterodora avenae* and *Heterodora trifolii*), *Globodera* spp. (for example, *Globodera rostochiensis*), *Radopholus* spp. (for example, *Radopholus similes*), *Rotylenchulus* spp., *Pratylenchus* spp. (for example, *Pratylenchus neglectans* and *Pratylenchus penetrans*), *Aphelenchoides* spp., *Helicotylenchus* spp., *Hoplolaimus* spp., *Paratrichodorus* spp., *Longidorus* spp., *Nacobbus* spp., *Subanguina* spp. *Belonlaimus* spp., *Criconemella* spp., *Criconemoides* spp. *Ditylenchus* spp., *Dolichodorus* spp., *Hemicriconemoides* spp., *Hemicycliophora* spp., *Hirschmaniella* spp., *Hypsoperine* spp., *Macroposthonia* spp., *Melinius* spp., *Punctodera* spp., *Quinisulcius* spp., *Scutellonema* spp., *Xiphinema* spp., and *Tylenchorhynchus* spp.

The compositions of the present invention can be used on agricultural lands such as fields, paddy fields, lawns and orchards or on non-agricultural lands.

The present invention may be used to control diseases in agricultural lands for cultivating the plants without any phytotoxicity to the plant.

Examples of the crops on which the present compositions may be used include but are not limited to corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica, colocasia*, etc., flowers, foliage plants, turf grasses, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, Eucalyptus, *Ginkgo biloba*, lilac, maple, Quercus, poplar, Judas tree, *Liquidambar formosana*, plane tree, zelkova, Japanese arborvitae, fir wood, hemlock, juniper, *Pinus, Picea*, and *Taxus cuspidate*, etc.

In an embodiment, the constituent fungicides and insecticides of the combination of the present invention may be admixed in ratio of (1-80):(1-80):(1-80):(1:80)

In an aspect, the present invention may provide methods of controlling fungal diseases and insect pests comprising applying a combination comprising:
(a) at least one at least one diamide insecticide selected from broflanilide, chlorantraniliprole, cyantraniliprole, cyclaniliprole, cyhalodiamide, flubendiamide and tetraniliprole;
(b) at least one dithiocarbamate fungicide; and
(c) at least one other insecticide.

In an embodiment, the diamide insecticide, the dithiocarbamate fungicide, and at least one other insecticide may be selected according to any of the preferred embodiments of the combinations described hereinabove.

The combinations of the present invention may be sold as a pre-mix composition or a kit of parts such that individual actives may be mixed before spraying. Alternatively, the kit of parts may contain at least one diamide insecticide and the dithiocarbamate fungicide pre-mixed and the second insecticidal active may be admixed with an adjuvant such that the two components may be tank mixed before spraying.

Thus, an aspect of the present invention may provide a kit comprising:
a first insecticidal component comprising at least one insecticidal diamide compound selected from broflanilide, chlorantraniliprole, cyantraniliprole, cyclaniliprole, cyhalodiamide, flubendiamide and tetraniliprole;
a fungicidal component comprising at least one multi-site fungicidal compound; and
a second insecticidal component comprising at least another insecticidal compound.

Another aspect of the present invention may provide a kit comprising:
a first insecticidal component comprising at least one diamide compound selected from broflanilide, chlorantraniliprole, cyantraniliprole, cyclaniliprole, cyhalodiamide, flubendiamide and tetraniliprole;
a fungicidal component comprising at least one dithiocarbamate fungicide; and
a second insecticidal component comprising at least another insecticidal compound.

Yet another aspect of the present invention can provide a kit comprising:
a first insecticidal component comprising at least one diamide compound selected from broflanilide, chlorantraniliprole, cyantraniliprole, cyclaniliprole, cyhalodiamide, flubendiamide and tetraniliprole;
a fungicidal component comprising at least one dithiocarbamate fungicide; and
a second insecticidal component comprising at least two other insecticidal compounds.

The composition of the present invention maybe applied simultaneously as a tank mix or a formulation or may be applied sequentially. The application may be made to the soil before emergence of the plants, either pre-planting or post-planting, or to a plant propagation material. The application may be made as a foliar spray at different timings during crop development, with either one or two applications early or late post-emergence.

The compositions according to the invention can be applied before or after infection of the useful plants or the propagation material thereof by the fungi, or for prevention or curing of infestations of insect pest.

As demonstrated, the addition of a dithiocarbamate fungicide to a combination of anthranilamide insecticidal compound which are combined with at least one other insecticide, greatly improved the disease control as well as improved yield and demonstrated a synergistic effect. The lower the mixture performance in the disease control, the greater the additional benefit of the mancozeb when added to the compositions of the present invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

EXAMPLES

Studies were conducted to compare the efficacy of the combinations of the present invention. The efficacy of the combinations of amide insecticides with at least another insecticide were evaluated in the presence and absence of multi-site fungicide such as dithiocarbonates fungicides. The efficacy of these combinations were evaluated on various crops and target pests. The tests were carried out in various locations across India.

The efficacy of the combinations were evaluated on insect such as those belonging to Spodoptera sp., polyphagotarsonemus latus, Helicoverpa armigera, Helminthosporium sp, Cnaphalocrocis medinalis, Scirpophaga sp on various crops such as vegetable and cereal crops. The trial was carried out in Randomized Complete Block (RCB) method. Each trial was replicated four times and conducted under GEP guidelines. Application volumes were varied for each mixture. Such field trials were carried out at various locations so as to generate independent data, the locations were chosen randomly across India. The insecticidal and fungicidal actives were sprayed according to their recommended dosage.

Table A demonstrates efficacy of the combination of amide insecticide (Chlorantriniprole) with a second insecticide with and without multi-site fungicide such as dithiocarbamate fungicide (Mancozeb). The field trials were carried out in India at various locations. The percentage efficacy was calculated after 10 days of applications. The target pests and the concentration of the insecticides and the results are recorded in the tables B below:

TABLE A

| Sr. No | Combination | Dosage |
|---|---|---|
| A1 | Chlorantriniprole + Chlorfenapyr | 150 + 750 ml/g/ha |
| A2 | Chlorantriniprole + Chlorfenapyr + Mancozeb | 150 + 750 + 1500 ml/g/ha |
| B1 | Chlorantriniprole + Methoxyfenozide | 150 + 850 ml/g/ha |
| B2 | Chlorantriniprole + Methoxyfenozide + Mancozeb | 150 + 850 + 1500 ml/g/ha |
| C1 | Chlorantriniprole + Novaluron | 150 + 750 ml/g/ha |
| C2 | Chlorantriniprole + Novaluron + Mancozeb | 150 + 750 + 1500 ml/g/ha |

The combinations with and without a multi-site fungicide such as a dithiocarbamate fungicide were tested on various crops at various locations in India. The trial results were calculated and are tabulated below:

TABLE B

| Combination applied | Assessment method | Percentage control | Difference |
|---|---|---|---|
| A1 on Spodotera litura in chilli | Percentage control | 82.8 | |
| A2 on Spodoptera litura in chilli | Percentage control | 93.8 | +11% |
| A1 on Polyphagotarsonemus latus in chilli | Percentage control | 74.5 | |
| A2 on Polyphagotarsonemus latus in chilli | Percentage control | 88.5 | +14% |
| B1 on Helicoverpa armigera in tomato | Percentage control | 74.8 | |
| B2 on Helicoverpa armigera in tomato | Percentage control | 95 | +20.2% |
| C1 on Scirpophaga incertulas in paddy | Percentage control | 72.3 | |
| C2 on Scirpophaga incertulas in paddy | Percentage control | 95 | +22.7% |
| C1 on Cnaphalocrocis medinalis in paddy | Percentage control | 81 | |
| C2 on Cnaphalocrocis medinalis in paddy | Percentage control | 95.5 | +14.5% |

It was found that the incorporation of mancozeb greatly increased the efficacy of the insecticidal combination. No phytotoxicity was observed in any of the trials. The addition of mancozeb greatly improved yield and increased disease control.

The instant invention is more specifically explained by above examples. However, it should be understood that the scope of the present invention is not limited by the examples in any manner. It will be appreciated by any person skilled in this art that the present invention includes aforesaid examples and further can be modified and altered within the technical scope of the present invention.

The invention claimed is:

1. A method of controlling insect pests at a locus, method comprising applying to the pests a combination consisting of the active agents:
   (a) chlorantraniliprole;
   (b) mancozeb; and
   (c) one or more insecticidal compounds selected from chlorfenapyr, methoxyfenozide, novaluron, and combinations thereof.

2. A method of controlling insect pests at a locus, method comprising applying to the pests a composition comprising:
   a combination consisting of the active agents
   (a) chlorantraniliprole;
   (b) mancozeb; and
   (c) one or more insecticidal compounds selected from chlorfenapyr, methoxyfenozide, novaluron, and combinations thereof; and
   at least one agrochemically acceptable excipient.

* * * * *